United States Patent
Song et al.

(10) Patent No.: US 10,686,165 B2
(45) Date of Patent: Jun. 16, 2020

(54) ELECTRODE ASSEMBLY AND SECONDARY BATTERY INCLUDING THE SAME

(71) Applicant: SAMSUNG SDI CO., LTD., Yongin-si, Gyeonggi-do (KR)

(72) Inventors: Hyunhwa Song, Yongin-si (KR); Junwon Suh, Yongin-si (KR); Jeong-Doo Yi, Yongin-si (KR); Juhee Sohn, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 501 days.

(21) Appl. No.: 14/734,816

(22) Filed: Jun. 9, 2015

(65) Prior Publication Data
US 2016/0079574 A1    Mar. 17, 2016

(30) Foreign Application Priority Data
Sep. 17, 2014  (KR) .................. 10-2014-0123700

(51) Int. Cl.
| H01M 2/02 | (2006.01) |
| H01M 4/70 | (2006.01) |
| H01M 10/052 | (2010.01) |
| H01M 2/16 | (2006.01) |
| H01M 10/04 | (2006.01) |

(Continued)

(52) U.S. Cl.
CPC ....... *H01M 2/0212* (2013.01); *H01M 2/1673* (2013.01); *H01M 2/266* (2013.01); *H01M 4/70* (2013.01); *H01M 10/0436* (2013.01); *H01M 10/052* (2013.01); *H01M 10/0585* (2013.01); *H01M 2220/30* (2013.01)

(58) Field of Classification Search
CPC ............. H01M 2/263; H01M 10/0409; H01M 10/0431; H01M 2/266; H01M 4/70; H01M 2/0212; H01M 2/1673

USPC .......................................................... 429/163
See application file for complete search history.

(56) References Cited

U.S. PATENT DOCUMENTS

| 8,895,169 B2 | 11/2014 | Oh et al. |
| 8,900,742 B2 | 12/2014 | Ahn et al. |

(Continued)

FOREIGN PATENT DOCUMENTS

| CN | 102054957 A | 5/2011 |
| CN | 103988339 A | 8/2014 |

(Continued)

OTHER PUBLICATIONS

Extended European Search Report dated Jan. 29, 2016 in Corresponding European Patent Application No. 15181850.7.

(Continued)

*Primary Examiner* — Robert S Jones
*Assistant Examiner* — Abibatu O Ojo-Amoo
(74) *Attorney, Agent, or Firm* — Lee IP Law, P.C.

(57) ABSTRACT

An electrode assembly and a secondary battery including the same, the electrode assembly including a plurality of first polar plates, each first polar plate including a first coating portion coated with a first active material, and a bent first non-coated portion; a plurality of second polar plates, each second polar plate including a second coating portion coated as a second active material, and a bent second non-coated portion; and a plurality of separators between the first polar plates and the second polar plates.

19 Claims, 4 Drawing Sheets

(51) Int. Cl.
*H01M 2/26* (2006.01)
*H01M 10/0585* (2010.01)

(56) References Cited

U.S. PATENT DOCUMENTS

| | | | |
|---|---|---|---|
| 2011/0104541 A1 | 5/2011 | Ahn et al. | |
| 2011/0200858 A1* | 8/2011 | Fuhr | H01M 2/263 429/94 |
| 2011/0206976 A1* | 8/2011 | Yoo | H01M 2/1061 429/153 |

FOREIGN PATENT DOCUMENTS

| | | |
|---|---|---|
| CN | 203774413 U | 8/2014 |
| EP | 1 826 843 A1 | 8/2007 |
| EP | 2 326 929 A1 | 5/2011 |
| EP | 2 363 907 A1 | 9/2011 |
| EP | 2 535 966 A1 | 12/2012 |
| EP | 2 728 647 A1 | 5/2014 |
| JP | 2002-298825 A | 10/2002 |
| JP | 2005129393 A | 5/2005 |
| JP | 2012-099317 A | 5/2012 |
| JP | 2013178997 A | 9/2013 |
| KR | 2011-0048131 A | 5/2011 |
| KR | 1292998 B | 7/2013 |
| WO | WO 2010/030606 A2 | 3/2010 |

OTHER PUBLICATIONS

European Office Action issued by the European Patent Office dated May 24, 2018 in the examination of the European Patent Application No. 15 181 850.7.
Chinese Patent Office on Sep. 21, 2018 in the examination of the Chinese Patent Application No. 201510595462.7.
Chinese Office action dated Jun. 14, 2019.
Japanese Office action dated Jun. 24, 2019.
Office Action issued by the Chinese Patent Office dated Feb. 3, 2020 in the examination of the Chinese Patent Application No. 201510595462.7.

* cited by examiner

ELECTRODE ASSEMBLY AND SECONDARY BATTERY INCLUDING THE SAME

CROSS-REFERENCE TO RELATED APPLICATION

Korean Patent Application No. 10-2014-0123700, filed on Sep. 17, 2014, in the Korean Intellectual Property Office, and entitled: "Electrode Assembly and Secondary Battery Including the Same," is incorporated by reference herein in its entirety.

BACKGROUND

1. Field

Embodiments relate to an electrode assembly and a secondary battery including the same.

2. Description of the Related Art

Compact and light-weight portable electric or electronic devices such as cellular phones, laptop computers, or camcorders have recently been actively developed and produced. A battery back may be embedded in the portable electric or electronic devices for operation where there is no power supply. The battery pack may use a rechargeable secondary battery for economic efficiency. Examples of a secondary battery may include a nickel-cadmium (Ni—Cd) battery, a nickel-hydrogen (Ni-MH) battery, a lithium (Li) battery, and a lithium-ion (Li-ion) battery. For example, a Li-ion secondary battery may have an operation voltage that is about three times as high as that of a Ni—Cd battery or a Ni—H battery, which may be used as a power supply of portable electronic equipment. Also, the Li-ion secondary battery may be widely used due to its high energy density per unit weight. A secondary battery may use a lithium-based oxide as a positive electrode active material and a carbon material as a negative electrode active material.

SUMMARY

Embodiments are directed to an electrode assembly and a secondary battery including the same.

The embodiments may be realized by providing an electrode assembly including a plurality of first polar plates, each first polar plate including a first coating portion coated with a first active material, and a bent first non-coated portion; a plurality of second polar plates, each second polar plate including a second coating portion coated as a second active material, and a bent second non-coated portion; and a plurality of separators between the first polar plates and the second polar plates.

The plurality of first polar plates may include a plurality of first non-coated portions, the plurality of second polar plates may include a plurality of second non-coated portions, and the plurality of first non-coated portions and the plurality of second non-coated portions may be each bent in a Z shape.

The first polar plates that include the first coating portion and the second polar plates that include the second coating portion may be alternately stacked in a stack portion of the electrode assembly.

The plurality of first polar plates may include a plurality of first non-coated portions, the plurality of second polar plates may include a plurality of second non-coated portions, and the plurality of first non-coated portions and the plurality of second non-coated portions may be each bent in a shape in which the first non-coated portions or the second non-coated portions are repeatedly folded back on one another in alternating directions.

The plurality of first polar plates may include a plurality of first non-coated portions, the plurality of second polar plates may include a plurality of second non-coated portions, and the plurality of first non-coated portions and the plurality of second non-coated portions may be each bent in to have a corrugated shape.

The first polar plates may be stacked in a first direction with a first interval therebetween, the second polar plates may be stacked in the first direction with a second interval therebetween, and the first interval may be equal to the second interval.

A width of the bent first non-coated portion in the first direction may be equal to or smaller than the first interval.

The plurality of first polar plates may include a plurality of first non-coated portions stacked at one side of a first end of the electrode assembly, the plurality of second polar plates may include a plurality of second non-coated portions stacked at another side of the first end of the electrode assembly.

The embodiments may be realized by providing a secondary battery including an electrode assembly and a case accommodating the electrode assembly, the electrode assembly including a plurality of first polar plates, each first polar plate including a first coating portion coated with a first active material, and a bent first non-coated portion; a plurality of second polar plates, each second polar plate including a second coating portion coated as a second active material, and a bent second non-coated portion; and a plurality of separators between the first polar plates and the second polar plates.

The plurality of first polar plates may include a plurality of first non-coated portions, the plurality of second polar plates may include a plurality of second non-coated portions, and the plurality of first non-coated portions and the plurality of second non-coated portions may be each bent in a Z shape.

The first polar plates that include the first coating portion and the second polar plates that include the second coating portion may be alternately stacked in a stack portion of the electrode assembly.

The plurality of first polar plates may include a plurality of first non-coated portions, the plurality of second polar plates may include a plurality of second non-coated portions, and the plurality of first non-coated portions and the plurality of second non-coated portions are each bent in a shape in which the first non-coated portions or the second non-coated portions may be repeatedly folded back on one another in alternating directions.

The plurality of first polar plates may include a plurality of first non-coated portions, the plurality of second polar plates may include a plurality of second non-coated portions, and the plurality of first non-coated portions and the plurality of second non-coated portions may be each bent to have a corrugated shape.

The first polar plates may be stacked in a first direction with a first interval therebetween, the second polar plates may be stacked in the first direction with a second interval therebetween, and the first interval may be equal to the second interval.

A width of the bent first non-coated portion in the first direction may be equal to or smaller than the first interval.

The plurality of first polar plates may include a plurality of first non-coated portions stacked at one side of a first end of the electrode assembly, and the plurality of second polar plates may include a plurality of second non-coated portions stacked at another side of the first end of the electrode assembly.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
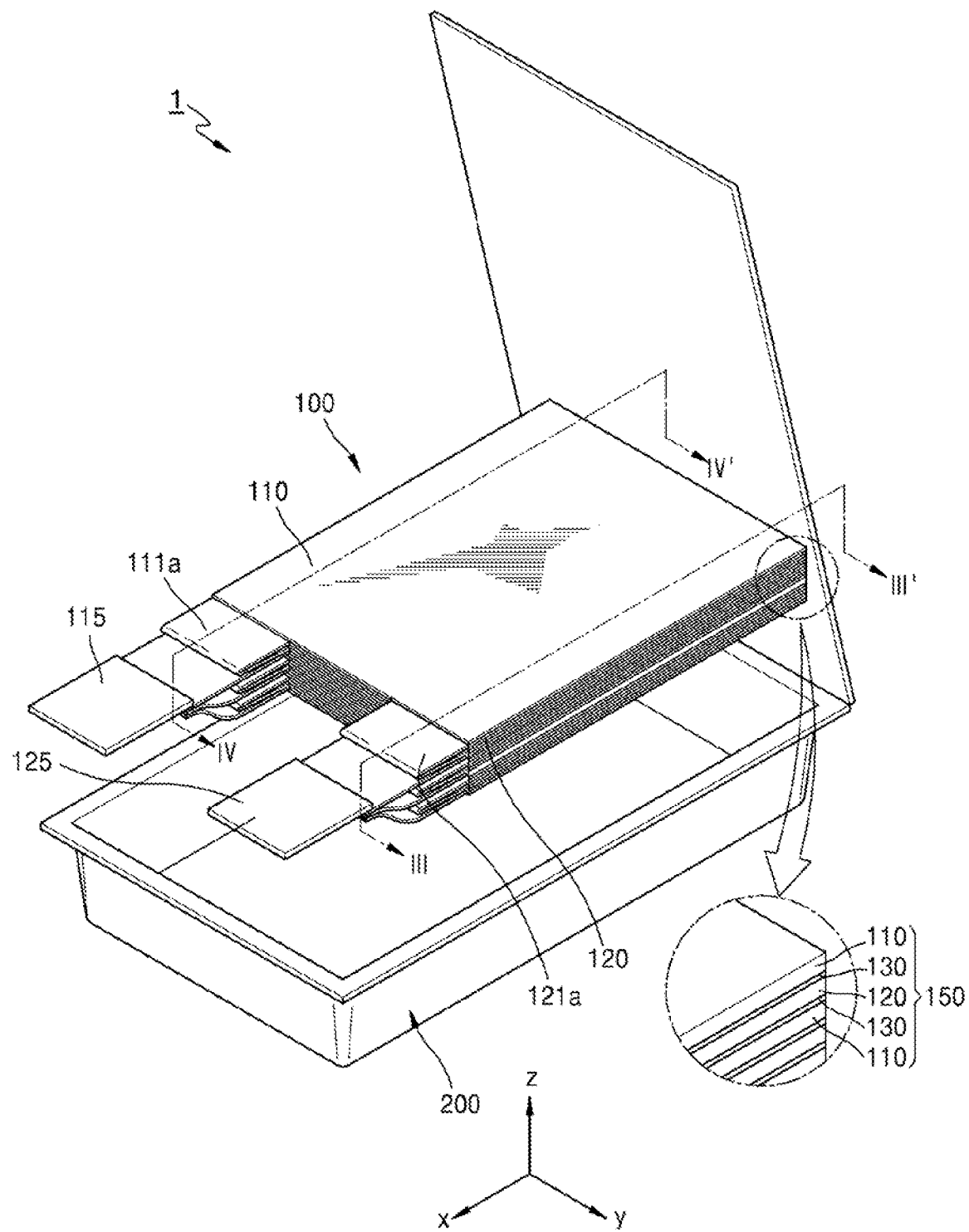
FIG. 1 illustrates a perspective view of a disassembled secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that although the terms "first", "second", etc. may be used herein to describe various components, these components should not be limited by these terms. These components are only used to distinguish one component from another.

Singular expressions, unless defined otherwise in contexts, include plural expressions.

In the embodiments below, it will be further understood that the terms "comprise" and/or "have" used herein specify the presence of stated features or components, but do not preclude the presence or addition of one or more other features or components.

In the embodiments below, it will be understood when a portion such as a layer, an area, or an element is referred to as being "on" or "above" another portion, it can be directly on or above the other portion, or intervening portion may also be present.

In the embodiments below, an x-axis, a y-axis, and a z-axis are not limited to three axes on a rectangular coordinates system but may be construed as including these axes. For example, an-x axis, a y-axis, and a z-axis may be at right angles or not may also indicate different directions from one another, which are not at right angles.

FIG. 1 illustrates a perspective view of a disassembled secondary battery 1 according to an embodiment.

Referring to FIG. 1, the secondary battery 1 may include an electrode assembly 100 and a case 200 that accommodates the electrode assembly 100.

The electrode assembly 100 may include a first polar plate 110, a second polar plate 120, and a separator 130 between the first polar plate 110 and the second polar plate 120. The first polar plate 110 and the second polar plate 120 may have different polarities. In an implementation, the first polar plate 110 may be understood as having a positive polarity and the second polar plate 120 may be understood as having a negative polarity that is different from the polarity of the first polar plate 110.

The first polar plate 110 may include a first coating portion 112 (coated with a first active material) and a first non-coated portion 111a (that is not coated with the first active material). The first coating portion 112 may be formed by applying the first active material on two surfaces or one surface of a first base layer 111 for coating. The first non-coated portion 111a may be a portion that extends from the first base layer 111 and may be bent.

The second polar plate 120 may include a second coating portion 122 (coated with a second active material) and a second uncoated portion 121a (that is not coated with the second active material). The second coating portion 122 may be formed by applying the second active material on two surfaces or one surface of a second base layer 121 for coating. The second non-coated portion 121a may be a portion that extends from the second base layer 121 and may be bent.

The electrode assembly 100 may include a plurality of the first polar plates 110 and a plurality of the second polar plates 120. The plurality of first polar plates 110 and the plurality of second polar plates 120 may be alternately stacked, and the separator 130 may be respectively included between the first polar plates 110 and the second polar plates 120. Each of the first polar plates 110 may include the first non-coated portion 111a, e.g., such that the electrode assembly 100 may include a plurality of the first non-coated portions 111a, and the first non-coated portions 111a may be bent. Likewise, each of the second polar plates 120 may include a second non-coated portion 121a, e.g., such that the electrode assembly 100 may include a plurality of the second non-coated portions 121a, and the second non-coated portions 121a may be bent. For example, forming the electrode assembly 100 may include bending the first non-coated portion 111a of one first polar plate 110 and the second non-coated portion 121a of one second polar plate 120 and alternately stacking the first polar plates 110 and the second polar plates 120 respectively having the bent first non-coated portions 111a and the bent second non-coated portions 121a.

In an implementation, the first non-coated portions 111a may be bent in a 'Z' shape or in a '⇌' shape. In an implementation, the second non-coated portions 121a may be bent in a 'Z' shape or in a '⇌' shape. In an implementation, the first non-coated portions 111a and/or the second non-coated portions 121a may each be bent in a shape in which the first non-coated portions 111a or the second non-coated portions 121a are each repeatedly folded back on one another in alternating directions. In an implementation, the first non-coated portions 111a and/or the second non-coated portions 121a may each be bent to have a corrugated shape.

The above shapes are ones in which the first non-coated portions 111a and the second non-coated portions 121a have a form that is bent at least twice and ends thereof are respectively connected to a first lead tab 115 and a second lead tab 125, and accordingly, and empty space corresponding to steps may be efficiently filled. In an implementation, as long as the first non-coated portions 111a and the second non-coated portions 121a may be respectively connected to the first lead tab 115 and the second lead tab 125 and empty space corresponding to steps may also be effectively filled, the bent form thereof is not limited as illustrated in the drawing and the number of times of bending of the first and second non-coated portions 111a and 121a is also not limited thereto.

As described above, the electrode assembly 100 may be formed by alternately stacking the first polar plates 110 (including the first coating portion 112 and the bent first non-coated portion 111a) and the second polar plates 120 (including the second coating portion 122 and the bent second non-coated portion 121a). For example, the electrode assembly 100 may include a stack portion 150 (in which the first coating portion 112 and the second coating portion 122 are stacked) and the plurality of first non-coated portions 111a and the plurality of second non-coated portions 121a. For example, the first coating portion 112 and the second coating portion 122 may be stacked in the stack portion 150 of the electrode assembly 100.

As illustrated in FIG. 1, the first non-coated portions 111a may be disposed at a first side of the stack portion 150 of the electrode assembly 100, and the second non-coated portions 121a may be disposed at a second side of the stack portion 150 of the electrode assembly 100. For example, the first non-coated portions 111a may be respectively bent and stacked at the first side of the stack portion 150, and the second non-coated portions 121a may be respectively bent and stacked at the second side of the stack portion 150. For example, the first non-coated portions 111a may be stacked at one side of a first edge or end of the electrode assembly 100, and the second non-coated portions 121a may be stacked at another, opposite side of the same first edge or end of the electrode assembly 100.

The ends of the first non-coated portions 111a may be bonded to be in contact with one another. A first lead tab 115 may be connected to the bonded ends of the first non-coated portions 111a. Likewise, the ends of the second non-coated portions 121a may be bonded to be in contact with one another. A second lead tab 125 may be connected to bonded ends of the second non-coated portions 121a. In an implementation, when the electrode assembly 100 is accommodated in the case 200, a portion of the first lead tab 115 (that is bonded to the first non-coated portions 111a) and a portion of the second lead tab 125 (that is bonded to the second non-coated portions 121a) may be exposed outside the case 200.

The first lead tab 115 and the second lead tab 125 may be respectively connected to the first non-coated portions 111a and the second non-coated portions 121a to have different polarities. For example, the first lead tab 115 may be connected to the first non-coated portions 111a to have a first polarity, and the second lead tab 125 may be connected to the second non-coated portions 121a to have a second polarity (that is different from the first polarity). Although not illustrated in the drawings, portions of the first lead tab 115 and the second lead tab 125 that contact the case 200 may be attached with an insulation tape to increase a sealing degree with respect to the case 200 and to provide electrical insulation at the same time.

The case 200 may include an accommodation space that accommodates the electrode assembly 100. The case 200 may have a stacked structure on each of upper and lower surfaces of an aluminum thin film. An inner surface of the case 200 may be formed of a heat adhesive resin. For example, the case 200 may have a stacked structure that is covered with a synthetic resin such as nylon, polypropylene, or polyethylene on upper and lower surfaces of an aluminum thin film, and the inner surface of the case 200 may be formed of or may include a heat adhesive resin. Accordingly, the case 200 may be sealed as the heat adhesive resin coated on the inner surface thereof is fused by applying heat or pressure. In an implementation, the case 200 may accommodate the electrode assembly 100 and an electrolyte solution (not shown), and may be a flexible pouch case.

Figure 2:
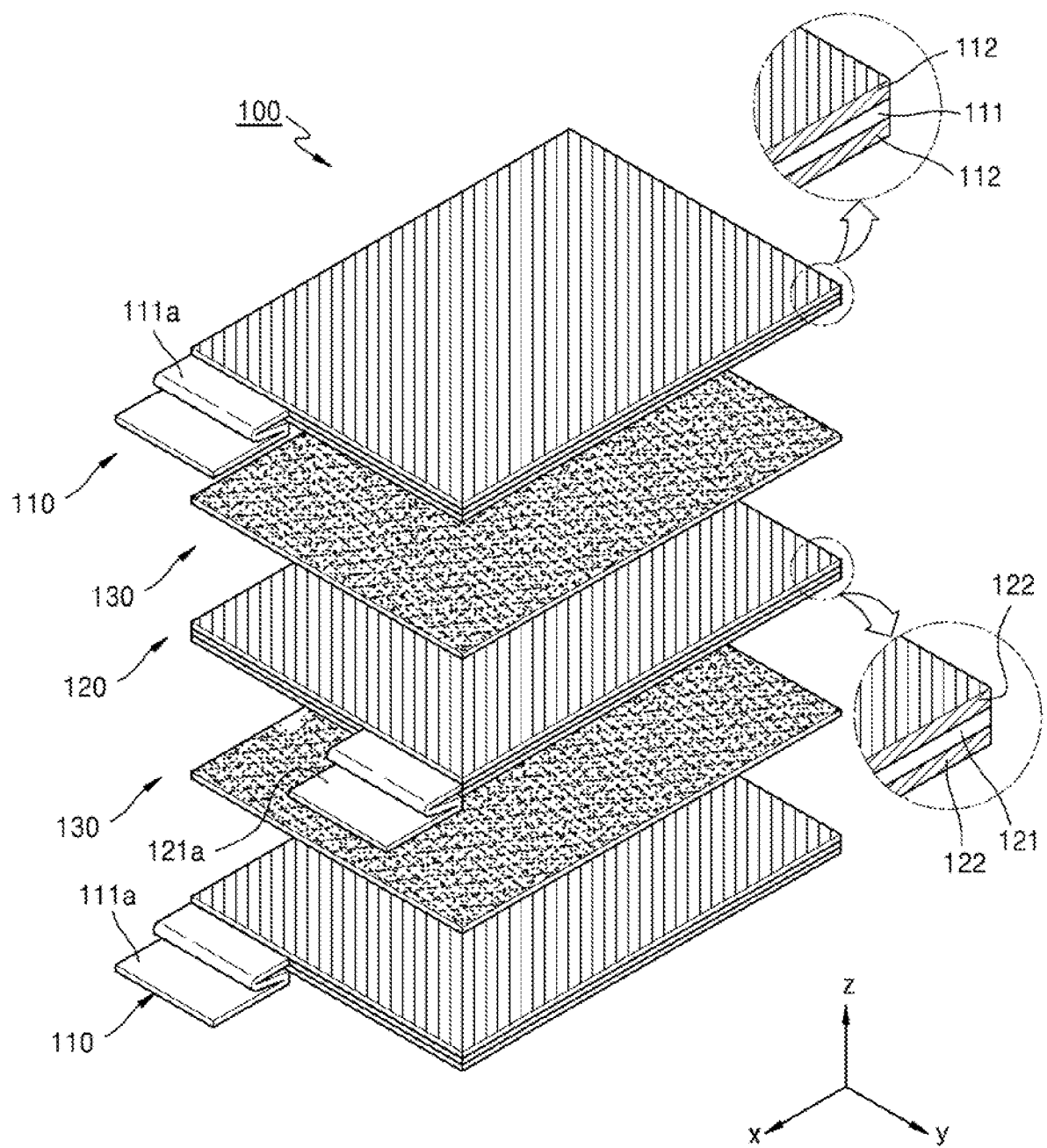
FIG. 2 illustrates a perspective view of a portion of the disassembled secondary battery of FIG. 1.

FIG. 2 illustrates a perspective view of a portion of the disassembled electrode assembly 100 of FIG. 1. The electrode assembly 100 according to an embodiment will be described in detail with reference to FIG. 2.

Referring to FIG. 2, the first polar plate 110 may include the first base layer 111, the first non-coated portion 111a, and the first coating portion 112. The electrode assembly 100 may include a plurality of the first polar plates 110. The first base layer 111 may be formed of or may include a conductive metal, e.g., aluminum (Al). The first non-coated portion 111a may be formed by extending a portion of the first base layer 111, e.g., may be an extension of the first base layer 111. The first coating portion 112 may be formed by coating the first base layer 111 with a first active material. A suitable active material may be used as the first active material. In an implementation, the first active material may include, e.g., lithium cobalt oxide ($LiCoO_2$). In an implementation, the first active material may include, e.g., a silicon-based material, a tin-based material, an aluminum-based material, or a germanium-based material. In an implementation, the first active material may include, e.g., a lithium titanium oxide (LTO).

The second polar plate 120 may include the second base layer 121, the second non-coated portion 121a, and the second coating portion 122. The electrode assembly 100 may include a plurality of the second polar plates 120. The second base layer 121 may be formed of or may include a conductive metal, e.g., copper (Cu). The second non-coated portion 121a may be formed by extending a portion of the second base layer 121, e.g., may be an extension of the second base layer 121. The second coating portion 122 may be formed by coating the second base layer 121 with a second active material. A suitable active material may be used as the second active material, e.g., graphite.

The separator 130 may be interposed between the first polar plates 110 and the second polar plates 120. The separator 130 may be an insulating thin film having a high ion transmittivity and a high mechanical intensity. A pore diameter of the separator 130 may be, e.g., about 0.01 μm to about 10 μm, and a thickness thereof may be, e.g., about 5 μm to about 300 μm. Examples of the separator 130 may include a sheet or nonwoven fabric formed of olefin-based polymer, glass fiber, or polyethylene. When a solid electrolyte such as polymer is used as an electrolyte, the solid electrolyte may also function as the separator 130.

As noted above, the first non-coated portion 111a may be a portion of the first polar plate 110 that is not coated with the first active material and may be formed by extending a portion of the first base layer 111. As noted above, the second non-coated portion 121a may be a portion of the second polar plate 120 that is not coated with the second active material and may be formed by extending a portion of the second base layer 121. As described above, the first non-coated portion 111a may be connected to the first lead tab 115 to have a first polarity, and the second non-coated portion 121a may be connected to the second lead tab 125 to have a second polarity that is different from the first polarity.

The first non-coated portion 111a may be disposed at the first side of the electrode assembly 100, and the second non-coated portion 121a may be disposed at the second side of the electrode assembly 100. For example, referring to FIG. 2, the first non-coated portion 111a may be disposed at one end of the first polar plate 110 (in a −y axis direction), and the second non-coated portion 121a may be disposed at another end of the second polar plate 120 (in a +y axis direction). As described above, the electrode assembly 100 may be formed by alternately stacking the first polar plates 110 and the second polar plates 120 in which the first non-coated portions 111a and the second non-coated portions 121a are respectively arranged in a staggered manner. The above-described arrangement may help prevent a short circuit by arranging the first non-coated portions 111a and the second non-coated portions 121a (having different polarities) at sufficient distances apart from one another.

As described above, the electrode assembly 100 may include the plurality of first polar plates 110 and the plurality of second polar plates 120 (that are alternately stacked) and the separator 130 (that is between the first polar plates 110 and the second polar plates 120 and that separates the first polar plates 110 and the second polar plates 120). Accordingly, a step may be formed between the first non-coated portions 111a (that are respectively included in the plurality of first polar plates 110), e.g., by a space in which the second polar plates 120 and the separator 130 are disposed. Likewise, a step may be formed between the second non-coated portions 121a (that are respectively included in the plurality of second polar plates 120), e.g., by a space in which the first polar plates 110 and the separator 130 are disposed. For example, there may be spaces between bases of the non-coated portions 111a, 121a where the non-coated portions 111a, 121a extend from the base layers 111, 121. The first non-coated portion 111a and the second non-coated portions 121a may be formed of metal and may be relatively thin, and thus could be, e.g., broken or cut due to the step.

To help prevent the above-described cutting or breaking, the electrode assembly 100 according to the present embodiment may be formed by stacking the first polar plate 110 (including the bent first non-coated portion 111a) and the second polar plate 120 (including the bent second non-coated portion 121a). Regarding the first non-coated portions 111a of FIG. 2, two separators 130 and one second polar plate 120 may be interposed between every two adjacent first polar plates 110. Thus, a step corresponding to thicknesses of the two separators 130 and the one second polar plate 120 may be formed between the two adjacent first polar plates 110, e.g., at bases of the first non-coated portions 111a. One first non-coated portion 111a may be bent so as to fill the space corresponding to the step, thereby remarkably minimizing damage, e.g., breaking or cutting of the first non-coated portion 111a, due to the step.

As described above, also in the case of the second non-coated portion 121a, two separators 130 and one first polar plate 110 may be interposed between every two adjacent second polar plates 120. Thus, a step corresponding to thicknesses of the two separators 130 and the one first polar plate 110 may be formed between the two adjacent second polar plates 120, e.g., at bases of the second non-coated portions 121a. One second non-coated portion 121a may be bent so as to fill the space corresponding to the step, thereby remarkably minimizing damage, e.g., breaking or cutting of the second non-coated portion 121a, due to the step.

As noted above, the first non-coated portions 111a and the second non-coated portions 121a may be bent, e.g., in a 'Z' shape, in a '⊐' shape, in a corrugated shape, or the like. The above shapes may be ones in which the first non-coated portions 111a and the second non-coated portions 121a are bent at least twice and ends thereof are respectively connected to the first lead tab 115 and the second lead tab 125. Accordingly, the empty space corresponding to a step may be efficiently filled. In an implementation, as long as the first non-coated portion 111a and the second non-coated portion 121a are respectively connected to the first lead tab 115 and the second lead tab 125 and the empty space corresponding to the step are also effectively filled, the bent form thereof may not be limited as illustrated in the drawings and the number of times of bending may also not be limited thereto.

Figure 3:
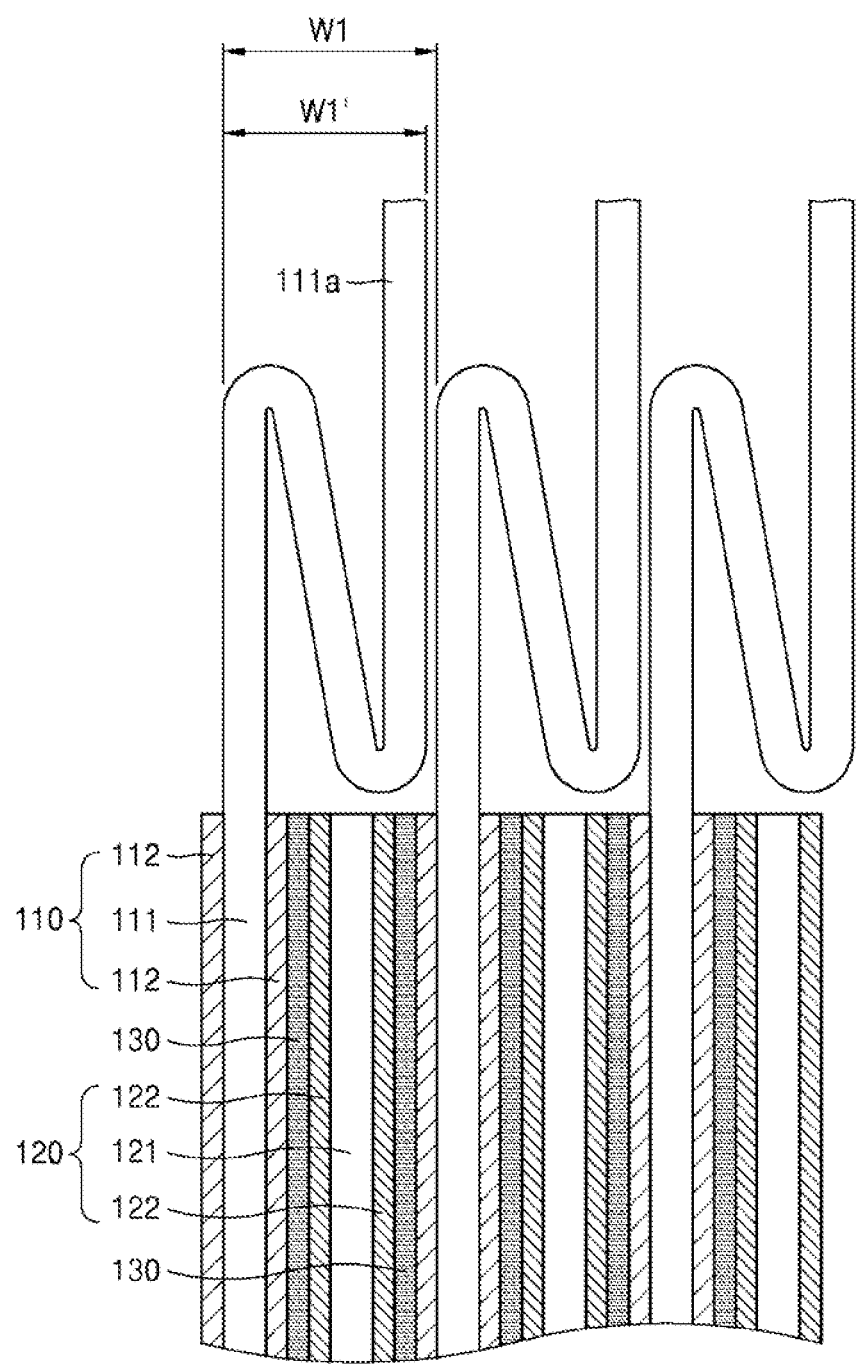
FIG. 3 illustrates a cross-sectional view of a portion of the secondary battery of FIG. 1 taken along a line III-III'.
Figure 4:
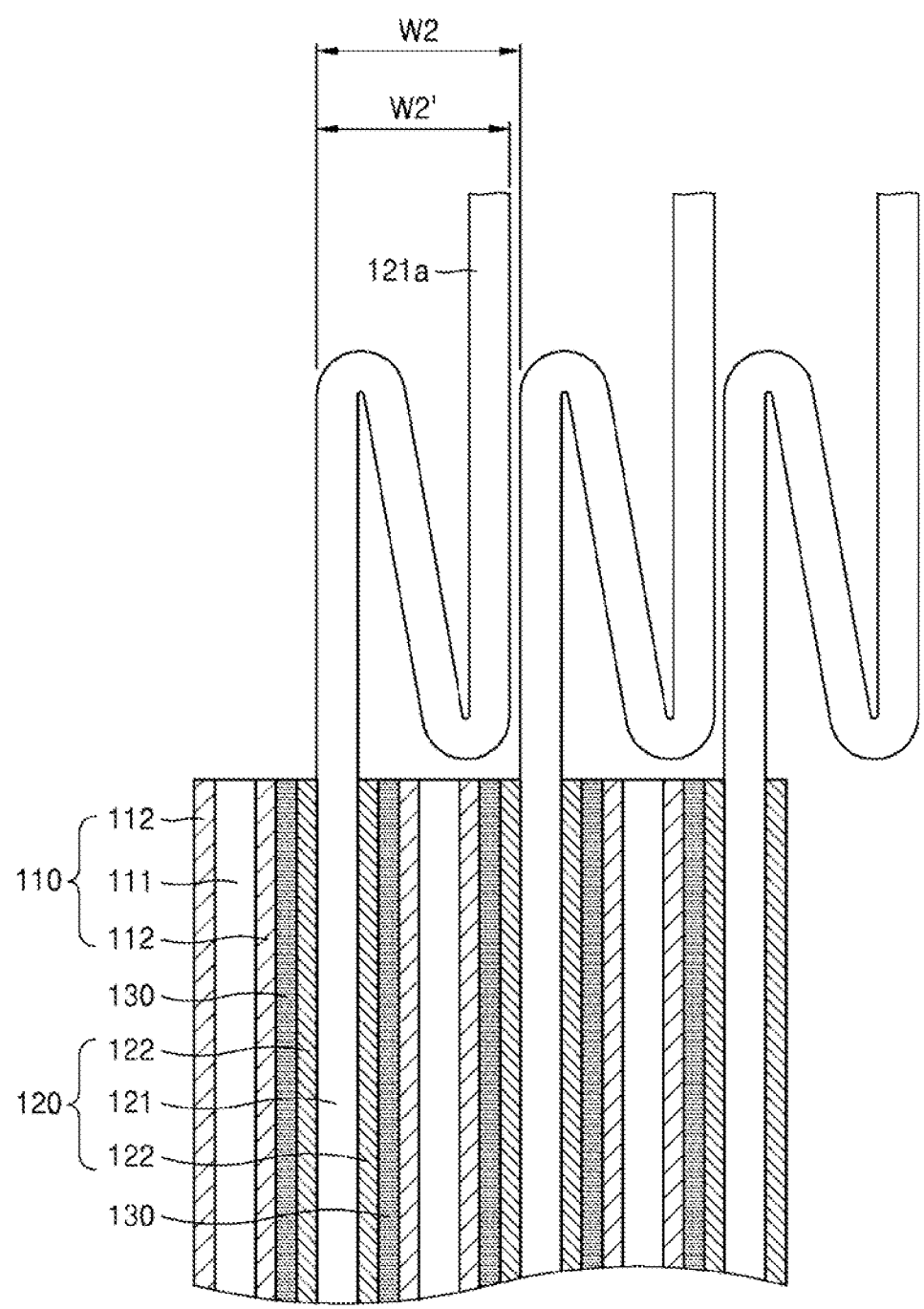
FIG. 4 illustrates a cross-sectional view of a portion of the secondary battery of FIG. 1 taken along a line IV-IV'.

FIG. 3 illustrates a cross-sectional view of a portion of the secondary battery 1 of FIG. 1 including the first non-coated portion 111a, taken along a line III-III'. FIG. 4 illustrates a cross-sectional view of a portion of the secondary battery 1 of FIG. 1 including the second non-coated portion 121a, taken along a line IV-IV'.

Referring to FIG. 3, two separators 130 and one second polar plate 120 may be interposed between every two adjacent first polar plates 110. For example, a first interval W1 (corresponding to a sum of thicknesses of the two separators 130 and the one second polar plate 120 between the two adjacent first polar plates 110) may be formed. For example, two adjacent first polar plates 110 may be spaced apart from one another in a first direction (e.g., z-axis direction in FIG. 1) by the first interval W1. In this case, the bent first non-coated portion 111a may fill the space formed by or corresponding to the first interval W1. A width W1' of the bent first non-coated portion 111a in the first direction may be equal to or smaller than the first interval W1. Maintaining the width W1' of the bent first non-coated portion 111a equal to or less than the first interval W1 may help reduce the probability of and/or prevent damage to the first non-coated portion 111a caused by tension between portions of the bent first non-coated portion 111a. Thus, it may be sufficient that the width W1' of the bent first non-coated portion 111a compensates for the empty space of the first interval W1.

Likewise, referring to FIG. 4, two separators 130 and one first polar plate 110 may be interposed between every two adjacent second polar plates 120. For example, a second interval W2 (corresponding to a sum of thicknesses of the two separators 130 and the one first polar plate 110 between the two adjacent first polar plates 110) may formed. For example, two adjacent second polar plates 120 may be spaced apart from one another in the first direction by the first interval W1. In this case, the bent second non-coated portion 121a may fill the space formed by the second interval W2. A width W2' of the bent second non-coated portion 121a in the first direction may be equal to or smaller than the second interval W2. Maintaining the width W2' of the bent second non-coated portion 121a about equal to or less than the second interval W2 may help reduce the probability of and/or prevent damage to the second non-coated portion 121a due to tension between portions of the bent second non-coated portion 121a. Thus, it may be sufficient that the width W2' of the bent second non-coated portion 121a compensates for the empty space of the second interval W2.

As described above, two separators 130 and one second polar plate 120 may be interposed between two adjacent, e.g., every two adjacent, first polar plates 110, and two separators 130 and one first polar plate 110 may be interposed between two adjacent, e.g., every two adjacent, second polar plates 120. Thus, the first interval W1 between the first polar plates 110 may be the same as or about the same as the second interval W2 between the second polar plates 120.

The bent first non-coated portion 111a may compensate for the step corresponding to the first interval W1 between the first polar plates 110, the bent second non-coated portions 121a may compensate for the step corresponding to the second interval W2 between the second polar plates 120, and damage, e.g., breaking or cutting of the first non-coated portion 111a and the second non-coated portion 121a, may be reduced and/or prevented, thereby remarkably improving the reliability of the secondary battery 1.

As described above, according to an embodiment, a secondary battery having improved durability and safety may be implemented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrode assembly comprising a plurality of first polar plates having a first polarity, each first polar plate including: a first coating portion coated with a first active material, and a bent first non-coated portion including a first extending portion, a first bending portion and a second extending portion continuous with each other and a third extending portion, a second bending portion, and a fourth extending portion continuous with each other; the second extending portion of each first polar plate straightly extends from the first bending portion of each first polar plate toward and to be closer to the second coating portion of each second polar plate adjacent to each first polar plate, and the fourth extending portion of each second polar plate straightly extends from the second bending portion of each second polar plate toward and to be closer to the first coating portion of each first polar plate adjacent to each second polar plate and the second extending portion extends from the first bending portion toward the second coating portion at an acute angle with respect to the first extending portion to overlap the first extending portion and the fourth extending portion extends from the second bending portion toward the first coating portion at an acute angle with respect to the third extending portion to overlap the third extending portion, an end portion of the first non-coated portion is extended to the opposite side of the first polar plate and directly connected to a first lead tab, and an end portion of the second non-coated portion is extended to the opposite side of the second polar plate and directly connected to a second lead tab.

2. The electrode assembly as claimed in claim 1, wherein: the plurality of first polar plates includes a plurality of first non-coated portions,
the plurality of second polar plates includes a plurality of second non-coated portions, and
the plurality of first non-coated portions and the plurality of second non-coated portions are each bent in a Z shape.

3. The electrode assembly as claimed in claim 2, wherein the first polar plates that include the first coating portion and the second polar plates that include the second coating portion are alternately stacked in a stack portion of the electrode assembly.

4. The electrode assembly as claimed in claim 1, wherein: the plurality of first polar plates includes a plurality of first non-coated portions,
the plurality of second polar plates includes a plurality of second non-coated portions, and
the plurality of first non-coated portions and the plurality of second non-coated portions are each bent in a shape in which the first non-coated portions or the second non-coated portions are repeatedly folded back on one another in alternating directions.

5. The electrode assembly as claimed in claim 1, wherein: the plurality of first polar plates includes a plurality of first non-coated portions,
the plurality of second polar plates includes a plurality of second non-coated portions, and
the plurality of first non-coated portions and the plurality of second non-coated portions are each bent to have a corrugated shape.

6. The electrode assembly as claimed in claim 1, wherein: the first polar plates are stacked in a first direction with a first interval therebetween,
the second polar plates are stacked in the first direction with a second interval therebetween, and
the first interval is equal to the second interval.

7. The electrode assembly as claimed in claim 6, wherein a width of the bent first non-coated portion in the first direction is equal to or smaller than the first interval.

8. The electrode assembly as claimed in claim 1, wherein: the plurality of first polar plates includes a plurality of first non-coated portions stacked at one side of a first end of the electrode assembly, and
the plurality of second polar plates includes a plurality of second non-coated portions stacked at another side of the first end of the electrode assembly.

9. A secondary battery comprising an electrode assembly and a case accommodating the electrode assembly, the electrode assembly including: a plurality of first polar plates having a first polarity, each first polar plate including: a first coating portion coated with a first active material, and a bent first non-coated portion including a first extending portion, a first bending portion and a second extending portion continuous with each other and a third extending portion, a second bending portion, and a fourth extending portion continuous with each other; the second extending portion of each first polar plate straightly extends from the first bending portion of each first polar plate toward and to be closer to the second coating portion of each second polar plate adjacent to each first polar plate, and the fourth extending portion of each second polar plate straightly extends from the second bending portion of each second polar plate toward and to be closer to the first coating portion of each first polar plate adjacent to each second polar plate and the second extending portion extends from the first bending portion toward the second coating portion at an acute angle with respect to the first extending portion to overlap the first extending portion and the fourth extending portion extends from the second bending portion toward the first coating portion at an acute angle with respect to the third extending portion to overlap the third extending portion, an end portion of the first non-coated portion is extended to the opposite side of the first polar plate and directly connected to a first lead tab, and an end portion of the second non-coated portion is extended to the opposite side of the second polar plate and directly connected to a second lead tab.

10. The secondary battery as claimed in claim 9, wherein: the plurality of first polar plates includes a plurality of first non-coated portions, the plurality of second polar plates includes a plurality of second non-coated portions, and the plurality of first non-coated portions and the plurality of second non-coated portions are each bent in a Z shape.

11. The secondary battery as claimed in claim 9, wherein the first polar plates that include the first coating portion and the second polar plates that include the second coating portion are alternately stacked in a stack portion of the electrode assembly.

12. The secondary battery as claimed in claim 9, wherein:

the plurality of first polar plates includes a plurality of first non-coated portions, the plurality of second polar plates includes a plurality of second non-coated portions, and the plurality of first non-coated portions and the plurality of second non-coated portions are each bent in a shape in which the first non-coated portions or the second non-coated portions are repeatedly folded back on one another in alternating directions.

13. The secondary battery as claimed in claim 9, wherein:

the plurality of first polar plates includes a plurality of first non-coated portions, the plurality of second polar plates includes a plurality of second non-coated portions, and the plurality of first non-coated portions and the plurality of second non-coated portions are each bent to have a corrugated shape.

14. The secondary battery as claimed in claim 9, wherein:

the first polar plates are stacked in a first direction with a first interval therebetween, the second polar plates are stacked in the first direction with a second interval therebetween, and the first interval is equal to the second interval.

15. The secondary battery as claimed in claim 14, wherein a width of the bent first non-coated portion in the first direction is equal to or smaller than the first interval.

16. The secondary battery as claimed in claim 9, wherein:

the plurality of first polar plates includes a plurality of first non-coated portions stacked at one side of a first end of the electrode assembly, and the plurality of second polar plates includes a plurality of second non-coated portions stacked at another side of the first end of the electrode assembly.

17. The electrode assembly as claimed in claim 1, wherein:

the plurality of first polar plates are stacked in a first direction, and the first and second extending portions of the bent first non-coated portion of each first polar plate overlap each other in the first direction.

18. The electrode assembly as claimed in claim 1, wherein:

each of the bent first and second non-coated portions includes at least three linear portions and at least two bending portions, the at least three linear portions and the at least two bending portions being arranged alternately, the first and second extending portions are two of the at least three linear portions of the bent first non-coated portion, the third and fourth extending portions are two of the at least three linear portions of the bent second non-coated portion, the first bending portion is one of the at least two bending portions of the bent first non-coated portion, and the second bending portion is one of the at least two bending portions of the bent second non-coated portion, and two linear portions of the at least three linear portions in each of the bent first and second non-coated portions are parallel to each other and overlap each other, and a third linear portion of the at least three linear portions in each of the bent first and second non-coated portions is between and at an oblique angle with respect to the parallel two linear portions to define a Z shape.

19. The electrode assembly as claimed in claim 18, wherein the at least three linear portions and at least two bending portions of each of the bent first and second non-coated portions are arranged to fit in a space between two adjacent ones of plurality of first polar plates and the plurality of second polar plates, respectively.

* * * * *